(12) United States Patent
Ur et al.

(10) Patent No.: US 8,516,445 B2
(45) Date of Patent: Aug. 20, 2013

(54) MULTI-DIMENSION CODE COVERAGE

(75) Inventors: Shmuel Ur, Shorashim (IL); Eitan Daniel Farchi, Pardes Hana (IL)

(73) Assignee: International Business Machines Corporation, Armonk, NY (US)

( * ) Notice: Subject to any disclaimer, the term of this patent is extended or adjusted under 35 U.S.C. 154(b) by 1629 days.

(21) Appl. No.: 11/466,487

(22) Filed: Aug. 23, 2006

(65) Prior Publication Data
US 2008/0127099 A1    May 29, 2008

(51) Int. Cl.
*G06F 9/44* (2006.01)
*G06F 11/00* (2006.01)

(52) U.S. Cl.
USPC ............................................ 717/125; 714/45

(58) Field of Classification Search
None
See application file for complete search history.

(56) References Cited

U.S. PATENT DOCUMENTS

| | | | |
|---|---|---|---|
| 6,192,511 B1* | 2/2001 | Johnston et al. | 717/109 |
| 6,356,858 B1 | 3/2002 | Malka et al. | |
| 6,697,961 B1* | 2/2004 | Petrenko et al. | 714/26 |
| 6,779,135 B1* | 8/2004 | Ur et al. | 714/38 |
| 7,032,133 B1 | 4/2006 | Lang et al. | |
| 7,058,925 B2* | 6/2006 | Ball et al. | 717/106 |
| 7,114,111 B2* | 9/2006 | Noy | 714/738 |
| 7,657,867 B2* | 2/2010 | Ball et al. | 717/106 |
| 2002/0178281 A1* | 11/2002 | Aizenbud-Reshef et al. | 709/232 |
| 2003/0110474 A1* | 6/2003 | Ur et al. | 717/131 |
| 2003/0204834 A1* | 10/2003 | Ball et al. | 717/106 |
| 2005/0166094 A1 | 7/2005 | Blackwell et al. | |
| 2005/0229044 A1 | 10/2005 | Ball | |
| 2005/0235257 A1* | 10/2005 | Ball et al. | 717/108 |
| 2005/0278576 A1 | 12/2005 | Hekmatpour | |
| 2006/0010426 A1* | 1/2006 | Lewis et al. | 717/124 |

OTHER PUBLICATIONS

Tai, Kuo-Chung, Predicate-Based Test Generation for Computer Programs, Proceedings of the 15th International Conference on Software Engineering [online], May 1993, [retrieved Dec. 10, 2010], Retrieved from Internet: <http:http://ieeexplore.ieee.org/xpls/abs_all.jsp?arnumber=346037&tag=1>, pp. 267-276.*
Grinwald, G., et al., "User Defined Coverage—A Tool Supported Methodology for Design Verification," Proceedings of the 35th Annual Design Automation Conference [online], 1998 [retrieve Aug. 22, 2012], Retrieved from Internet: <http://dl.acm.org/citation.cfm?id=277081>, pp. 1-6.*
Ur, S. "Code and Functional Coverage Tutorial" [online], 1999 [retrieved Aug. 22, 2012], Retrieved from Internet: <http://cs.haifa.ac.il/courses/softtest/testing2004/Second/bigcoverage.PDF>, pp. 1-120.*
Sedigh-Ali, S. et al., "Temporal modeling of software test coverage", Proceedings 26th Annual International Computer Software and Applications, 2002, p. 823-8.
Emery, K.O. et al. "Multi-level software testing based on cyclomatic complexity". Vitro Technical Journal, v 8, n 1, Winter 1990, p. 23-40, USA.
A theory of predicate-complete test coverage and generation (Source: (ftp://ftp.research.microsoft.com/pub/tr/TR-2004-28.pdf).
Aspect Language Features for Concern Coverage Profiling (Source: (http://www.cs.iastate.edu/~hridesh/papers/aosd05.pdf).

* cited by examiner

*Primary Examiner* — Qamrun Nahar
*Assistant Examiner* — Todd Aguilera
(74) *Attorney, Agent, or Firm* — Daniel Kligler

(57) ABSTRACT

A method for testing software under test (SUT), including selecting a type of coverage for testing the SUT, and receiving from a human operator a Boolean predicate to be used in evaluation of the SUT. In response to the type of coverage and the predicate, a test of the SUT is generated. The method also includes performing an execution of the test so as to identify elements of the SUT that belong to the selected type and that are exercised by the test. The method further includes automatically evaluating the predicate for each of the identified elements, and determining the elements exercised by the test for which the predicate evaluates to true to be covered elements of the SUT.

11 Claims, 3 Drawing Sheets

MULTI-DIMENSION CODE COVERAGE

FIELD OF THE INVENTION

The present invention relates generally to testing software, and specifically to coverage tools for monitoring the tests.

BACKGROUND OF THE INVENTION

Coverage tools for checking software provide a measure of how well the software being evaluated has been exercised during testing, and thereby give a level of assurance that the software is of high quality. The tools may also detect and locate faults in the software. In order to check software under test (SUT), a test suite is developed, and each test in the suite is applied to the SUT.

There are a number of types of coverage known in the art, some of the common types being statement (or line) coverage, condition coverage, and path coverage. Tests in a test suite are typically developed according to the type of coverage that is to be measured.

For example, in statement coverage, each test is designed to exercise a number of statements in the SUT, and the measure provided by the test suite is typically a percentage of all the statements in the SUT that were exercised by at least one of the tests in the suite.

The prior art provides a number of different methods which are claimed to improve the efficacy of coverage tools.

U.S. Pat. No. 7,584,455, to Ball describes systems which are claimed to achieve improved test coverage. One system selects a set of predicates, calculates a set of possible predicate values, calculates a subset of the set of possible predicate values, and generates a test for the computer program based at least in part on the subset.

A paper titled "A Theory of Predicate-Complete Test Coverage and Generation," by Ball, may be found at ftp.research.microsoft.com/pub/tr/TR-2004-28.pdf. The paper describes predicate-complete testing (PCT), and gives as an example a program with m statements and n predicates, the latter being program defined. The size of the set of observable states of the program is at most $m \times 2^n$. The goal of PCT is to cover all reachable observable states in the program.

U.S. Pat. No. 6,356,858 to Malka, et al., describes a coverage measurement tool enabling a user to create a specific coverage tool for a coverage model. The specific coverage tool is associated with a database and consists of a set of coverage tasks specified by a user for checking a design such as a hardware or software system. The user chooses specific elements to be covered and provides instrumentation for the system.

SUMMARY OF THE INVENTION

In embodiments of the present invention, a method for testing software under test (SUT), is provided. The method includes selecting a type of coverage for testing the SUT, and receiving from a human operator a Boolean predicate to be used in evaluation of the SUT. The method further includes generating a test of the SUT in response to the type of coverage and the predicate, and executing the test so as to identify elements of the SUT that belong to the selected type and that are exercised by the test. The method also includes automatically evaluating the predicate for each of the identified elements, and determining the elements exercised by the test for which the predicate evaluates to true to be covered elements of the SUT.

There is also provided, according to one embodiment of the present invention, apparatus which operates on principles similar those of the method described above.

There is further provided, according to another embodiment of the present invention, a computer software product providing instructions to a computer, the instructions causing the computer to operate on principles similar those of the method described above.

The present invention will be more fully understood from the following detailed description of the embodiments thereof, taken together with the drawings, in which:

DETAILED DESCRIPTION OF EMBODIMENTS

Figure 1:
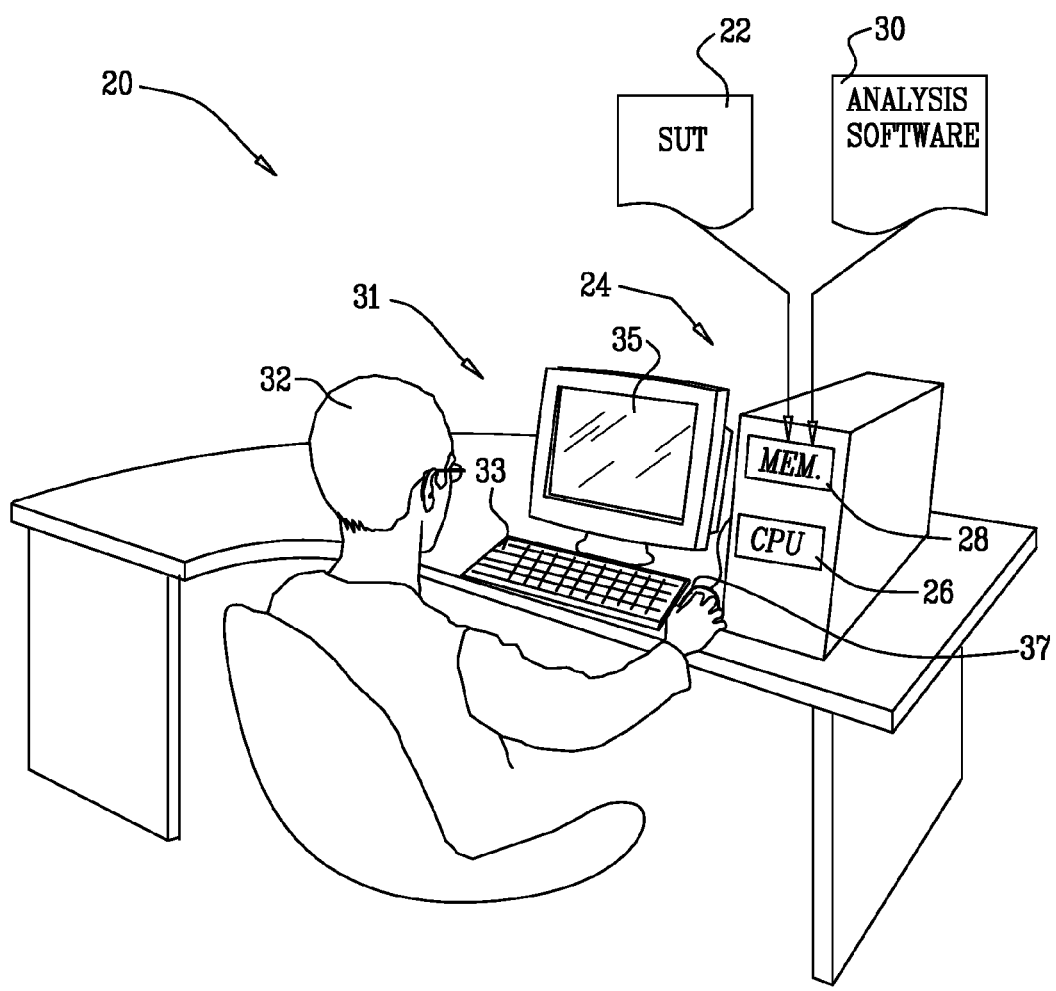
FIG. 1. is a diagram schematically showing a system for analyzing software, according to an embodiment of the present invention.

Reference is now made to FIG. 1, which is a diagram schematically showing a system 20 for analyzing software, according to an embodiment of the present invention. A computing system 24 comprises a central processing unit (CPU) 26, a user interface 31, and a memory 28. User interface 31 typically comprises a keyboard 33, a pointing device 37, and/or a screen 35. System 24 is operated by a test engineer 32 via the user interface. Software under test (SUT) 22 is typically stored in memory 28, as is analysis software 30 that the test engineer uses for testing SUT 22. Software 30 can be supplied in electronic form or on tangible media such as a magnetic storage disc or a compact disc which are readable by a computer, or other means known in the art for permanent storage of electronic data.

In embodiments of the present invention, software 30 tests coverage of the SUT, according to a specified type of coverage, for example statement coverage. The coverage is tested by applying a condition, herein termed a predicate, to exercised SUT elements, in this example statements. The type of coverage and the predicate are selected by the test engineer. (Types of coverage, elements associated with the types, and predicates, are described in more detail below.)

In the specification and in the claims, a predicate is any Boolean condition that software 30 is able to evaluate, or can determine that it cannot evaluate, as tests operated by the software to check the SUT are performed. Thus, a predicate returns one of the three values {not calculable, true, false}. For example, the engineer may select the predicate as "x>y." To find the value of "x>y," software 30 checks whether x and y both exist as numerical values. If they do, then the software checks the inequality and returns true or false accordingly. If either x or y does not exist as a numerical value, software 30 determines this and returns not calculable.

The software uses the type of coverage selected to test corresponding elements of the SUT, so that, in the above statement coverage example, the software tests statement elements of the SUT. The software evaluates a given statement to be a covered statement if and only if the specific statement is exercised and the selected predicate returns true. Generalizing, in the specification and in the claims, a given element is a covered element if and only if the given element is exercised and the selected predicate returns true.

Using the example of statement coverage with predicate "x>y," in performing its tests, software 30 automatically evaluates the predicate for every exercised statement in the SUT, and determines the number of covered statements as the tests are run on the SUT. The software typically uses the number of covered statements found during the tests to form a statement coverage metric, for example, by comparing the number of covered statements found with a total number of statements in the SUT. Software 30 provides similar coverage metrics for the SUT for other types of coverage.

The coverage metrics generated by software 30 provide a more narrowly focused analysis of the coverage of the SUT, compared to coverage metrics which are generated without predicates being evaluated for exercised elements of the SUT. The focusing effect may be varied by the engineer selecting specific predicates, allowing him/her to concentrate on specific regions or problem areas of the SUT, even down to the single element level of the SUT.

Table I below lists a number of different types of coverage known in the art, together with explanations of the types and the element or elements associated with the type. Other types of coverage are known in the art, and a more complete listing is given at www.bullseye.com/coverage.html.

TABLE I

| Type of Coverage | Explanation | Associated Element or Elements |
|---|---|---|
| Statement Coverage | Measures if each executable statement of the SUT has been exercised or not. | Executable Statement |
| Branch Coverage | Checks that a branching statement returns both true and false. | If-statement, while-statement, for-statement. |
| Multiple Condition Coverage | Checks that every possible combination of Boolean sub-expressions in a branching statement occurs. | If-statement, while-statement, for-statement, and their arguments. |
| Method Coverage | Measures the number of methods exercised or not exercised. | Method |

Below are examples of predicates that may be used by software 30.

The number of threads running>1
Thread number 30 is running
Thread number 30 is not running
The variable "environment" is 1 and the variable "heat" is not 0
The program "Graffics" is running
The utilization of CPU 26 is greater than 50%
The utilization of CPU 26 is not greater than 50%
The utilization of a CPU different from CPU 26 is greater than 80%
The unit test procedure is running
The value of x is greater than the value of y As shown in the above examples a predicate used by software 30 may typically be phrased as a positive statement, a negative statement, or as a combination of statements. The predicate or predicates that the test engineer selects typically include those which have some likelihood of interacting with, or applying to, SUT 22. Alternatively or additionally, the engineer may select predicates that are assumed to have little or no likelihood of such interaction with or application to the SUT. Application of both types of predicates may provide useful information when they are used by software 30.

In some embodiments of the present invention, the predicates may be selected on the basis of a property of SUT 22, and how the SUT is expected to influence, or be influenced by, operation of other software having the same or a different property. For example, SUT 22 may comprise a driver of a video game, or a component of such a game, with a property of an audio and/or a video output. A condition that may be selected in this case may comprise "another driver having the property of an audio and/or a video output is operating."

Figure 2:
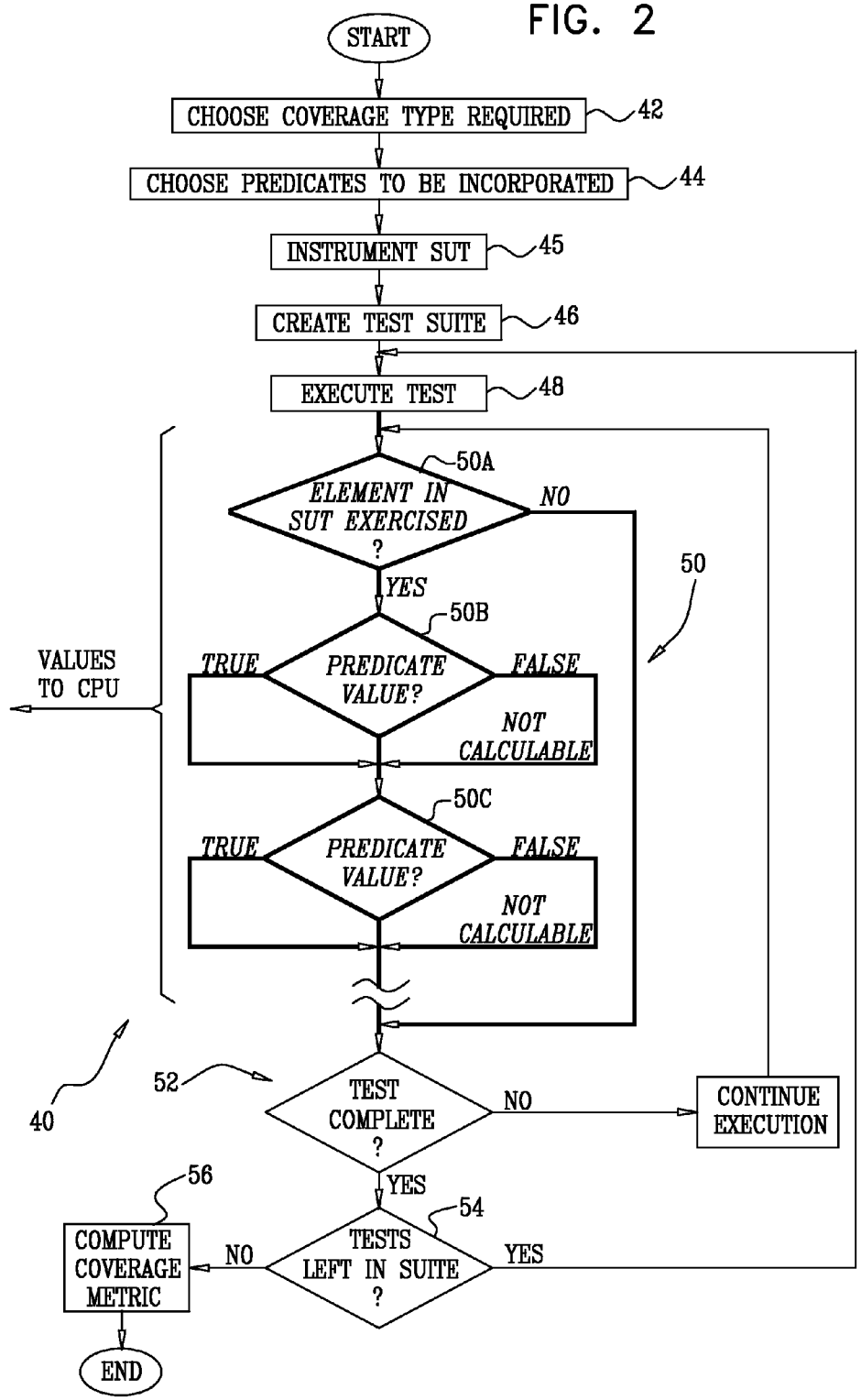
FIG. 2 is a flowchart showing steps involved in operating software, according to an embodiment of the present invention.

FIG. 2 is a flowchart 40 showing steps involved in operating software 30, according to an embodiment of the present invention. Table II shows an example of SUT 22 that is used to illustrate the description of the steps of the flowchart. The example is referred to hereinbelow as SUT 22E

TABLE II

| Line Number | Line of SUT 22E |
|---|---|
| 1 | Main( ) |
| 2 | int w; |
| 3 | w = 0; |
| 4 | { |
| 5 | for(int i=1; i≦2; i++) |
| 6 | { |
| 7 | int x, y; |
| 8 | read(x); |
| 9 | read(y); |
| 10 | if (x==y) { |
| 11 | W+=10; |
| 12 | } |
| 13 | if (x < y) { |
| 14 | W+=5; |
| 15 | } |
| 16 | if (x > y) { |
| 17 | W+=3; |
| 18 | } |
| 19 | } |
| 20 | print w |
| 21 | } |

In an initial step 42, the test engineer selects the type of coverage to be used in the tests of the SUT. The type may be selected from Table I or alternatively from any other type of coverage known in the art, such as one of those given at the reference above.

In a predicate-selection step 44, the test engineer selects one or more predicates to be incorporated into software 30.

Herein, by way of example, it is assumed that N predicates $P_1, \ldots, P_p, P_q, \ldots P_N$ are selected in step 44, where N is a positive integer, and $P_p, P_q$, are generic predicates.

For SUT 22E, it is assumed that the engineer selects two predicates as shown in Table III:

TABLE III

| Predicate Number | Predicate |
|---|---|
| 1 | w > −1 |
| 2 | w > 19 |

In an instrumentation step 45 the analysis software automatically instruments the SUT according to the type of coverage selected in step 42. For example, if statement coverage has been selected, then the statements of SUT 22 are considered as elements of the SUT that are to be tested and all are instrumented. Tools for performing instrumentation according to the selected type of coverage are known in the art. For example, a statement instrumentation tool EMMA may be found at emma.sourceforge.net. Typically, to perform the instrumentation, each element is assigned a unique variable, the value of which enables CPU 26 to record whether or not the element has been exercised by a test suite (described below). Herein, by way of example, the elements of the SUT are assumed to comprise L elements $E_1; \ldots, E_e, \ldots E_L$, where L is a positive integer. $E_e$ is a generic element and the elements are also referred to collectively as elements E. For SUT 22E, the instrumentation typically comprises adding respective lines of code after each of lines 3, 5, 8-11, 13, 14, 16, 17, and 20, i.e., for 11 lines of SUT 22E. Each added line of code has a respective unique variable evaluating to a value which is checked for by CPU 26 at conclusion of the tests.

In a suite creation step 46, the test engineer generates a test suite of one or more tests that are to be used to exercise and test the elements of the SUT. The tests incorporated in the test suite depend on the type of coverage selected in step 42, and on the predicates selected in step 44. As is described further below, flowchart 40 typically operates as an iterative process, during which the tests in the test suite and/or the instrumentation may be modified by the test engineer, typically in response to results generated.

For SUT 22E, the engineer is assumed to generate four tests with values as shown in Table IV:

TABLE IV

|        | i = 1         | i = 2         |
|--------|---------------|---------------|
| Test 1 | x = y = 5     | x = y = 3     |
| Test 2 | x = 3, y = 5  | x = 5, y = 3  |
| Test 3 | x = -3, y = -5 | x = -5, y = -3 |
| Test 3 | x = y = -5    | x = y = -3    |

In an execute test step 48 and in succeeding result generating steps 50, software 30 executes a test of the test suite on the SUT, to test elements E of the SUT. Steps 50 comprise conditions 50A, 50B, 50C, ..., described below. As the test executes, CPU 26 collects results of the test, i.e., which elements of the SUT have been exercised and which have not been exercised. In addition, for those elements exercised, the CPU evaluates the predicates, i.e., for each element E exercised, as determined by a coverage condition 50A evaluating as true, the CPU evaluates as true, false, or not calculable each predicate selected in step 44. By way of example, flowchart 40 shows two predicates as being evaluated, in conditions 50B, 50C, but it will be appreciated that the number of predicates actually evaluated is the number N chosen in step 44. The conditions evaluated for result generating steps 50, and the values of the conditions that may be used by CPU 26 for the results, are shown in FIG. 2 as italicized.

Depending on the predicate and/or how the engineer operates the tests of the test suite, CPU 26 may or may not need to evaluate the predicate as an element of the SUT is exercised. For example, for the predicate "the program Graffics is running," the engineer may set Graffics to run while all tests of the test suite are also run. In this case the engineer may supply the value of the predicate, i.e., that the predicate is true, to CPU 26 prior to running the test suite, since the value of the predicate is constant during the tests. Alternatively, the CPU may detect that the program Graffics is running, and evaluate the predicate to true automatically. As another example, if the predicate is "the procedure unit test is running," the value of the predicate may be set automatically by the CPU, or input to the CPU by the test engineer. In some embodiments of the present invention, the test engineer pre-supplies a library of predicates to the CPU, and the CPU calculates values of the predicates prior to running the test suite. In one embodiment, the predicate is provided to the CPU as code which the CPU runs during execution of flowchart 40.

For a predicate having a value which varies, such as a predicate provided as code, or "the number of threads running>1," CPU 26 evaluates the predicate as each element of the SUT is exercised.

In steps 52, activated after results generating steps 50 have completed, CPU 26 checks to see if the test being run has completed. If not, the CPU continues with the test by using steps 50 on further elements of the SUT. If the test has completed, in a step 54 the CPU checks if there are further tests in the test suite to be run, and runs these tests according to steps 48, 50, and 52. If there are no further tests in the test suite, in a computation step 56 CPU 26 computes one or more coverage metrics for the SUT, as described in more detail below, and flowchart 40 ends.

In computation step 56, the CPU typically determines numerical totals of each of the values, true, false, and not calculable, of each of the predicates selected in step 44. For a specific predicate, the total of the true values gives the total number of elements exercised for which the predicate returned true, the total of the false values gives the number of elements exercised for which the predicate returned false, and the total of the not calculable values gives the number of elements exercised for which the predicate returned not calculable. From one or more of the totals the CPU calculates a coverage metric for the SUT. Typically, the total number of the true values is used for the coverage metric since this corresponds to the total number of covered elements. However, the CPU may calculate the metric using any one of the totals. Typically, the CPU calculates the coverage metric as a percentage of the total number of elements E in SUT. Alternative metrics compare the number of true values with the total of the true and false values, or with the total of the false values.

Table V below gives results for SUT 22E, after the four tests described above have been run. The coverage metric for each predicate is assumed to be the covered elements as a percentage of the total number of elements.

TABLE V

|           | Results |       |                  |                   |
|-----------|---------|-------|------------------|-------------------|
| Predicate | True    | False | Not Calculable   | Total Elements    |
| w > -1    | 11      | 0     | 0                | 11                |

Coverage metric = $\frac{11}{11} = 100\%$

|           |   |   |   |    |
|-----------|---|---|---|----|
| w > 19    | 4 | 7 | 0 | 11 |

Coverage metric = $\frac{4}{11} = 44\%$

Consideration of the tests performed and of the results given in Table V demonstrates that for both predicates the final results were arrived at after performing the first three tests, and the fourth test did not change the results. However, the coverage metrics for the two different predicates are significantly different. By using the predicates in evaluation of the coverage, the test engineer is thus able to be more discriminating in designing and using the tests, and also in interpreting the results. For example, if in fact the value of w is always greater than 19, the coverage metric of 44% given by the second predicate may be assumed to be a more valid metric than that given by the first metric.

In the examples for SUT 22E described above with reference to Table III, the predicates chosen are substantially global, since w is calculable over substantially the whole program shown in Table II. In some embodiments of the present invention, the predicates are chosen to be local. In the specification and in the claims, a global predicate is a predicate having a global argument, i.e., an argument that returns a value over the whole of the SUT being tested, and a local predicate is a predicate having a local argument, i.e., an argument that returns a value over only a section of the SUT being tested. Choosing a predicate to be local enables the test engineer to analyze coverage within a particular section of a program and/or excluding the particular section, by generating respective coverage metrics for two sections. Such coverage metrics use local, i.e., partial, totals, compared to the global, i.e., complete, totals described above with reference to the global predicates.

By using local predicates, the test engineer may test any section of a program that is definable by one or more local variables, such as different program scopes, i.e., enclosing contexts, parts in a program abstract syntax tree, a method, a class, and/or a package. It will be understood that sections need not be exclusive. For example, a particular scope may include a number of methods. The methods may be assigned specific method sections, and the scope may also be assigned a section.

The following example explaining the use of local predicates uses SUT 22E, and except where otherwise indicated, follows the steps of flowchart 40 as described above. In this example the predicates selected in step 44 are as shown in Table VI.

TABLE VI

| Predicate Number | Predicate |
| --- | --- |
| 1 | x > y |
| 2 | i = 1 |

Rather than the four tests listed above in Table IV, in step 46 it is assumed that the test engineer generates tests giving random values of x, y for the possible values of i, i.e., i={1, 2,}, and that these values of x, y are available to SUT 22E as flowchart 40 executes.

Inspection of SUT 22E shows that the first predicate in Table VI returns the value "not calculable" at lines 3 and 20, since outside the for loop defined by line 5, values of x and y do not exist. For the second predicate, i also exists only in the for loop, so that in this case the predicate also returns the value "not calculable" at lines 3 and 20. Thus both predicates of Table VI act as local predicates, allowing analysis of SUT 22E to be made within the for loop section of SUT 22E and/or excluding the for loop section. However, as shown below, the two predicates give different results.

Table VII below gives results generated by software 30 for the predicates defined in Table VI. In addition to giving results for the complete SUT 22E, and for the for loop, Table VII shows a coverage metric for line 13. For the first predicate, x>y, software 30 shows that line 13 of SUT 22E is not covered. This contrasts with statement coverages known in the art where there is no predicate evaluated when the statement is exercised, which show that line 13 is covered.

TABLE VII

| | Results | | | |
| --- | --- | --- | --- | --- |
| Predicate | True | False | Not Calculable | Total Elements |
| x > y | | | | |
| Complete SUT 22E | 5 | 4 | 2 | 11 |
| for loop | 5 | 4 | 0 | 9 |
| Line 13 | 0 | 1 | 0 | 1 | coverage metric in the loop = $\frac{5}{9}$ = 56 % line 13 coverage metric = $\frac{0}{1}$ = 0%

| | Results | | | |
| --- | --- | --- | --- | --- |
| Predicate | True | False | Not Calculable | Total Elements |
| i = 1 | | | | |
| Complete SUT 22E | 9 | 0 | 2 | 11 |
| for loop | 9 | 0 | 0 | 9 | coverage metric in the loop = $\frac{9}{9}$ = 100 %

The results of Table VII demonstrate that local predicates, such as those exemplified in Table VI, provide a method for analysis of sections of a program. Furthermore, as shown by Table VII, choosing different predicates allows the same sections to be analyzed differently, and also allows for subdivisions of a section, such as one or more specific lines of code, to be analyzed.

It will be understood that in one implementation of software 30, at step 44 of flowchart 40, either global or local predicates or both may be chosen.

Figure 3:
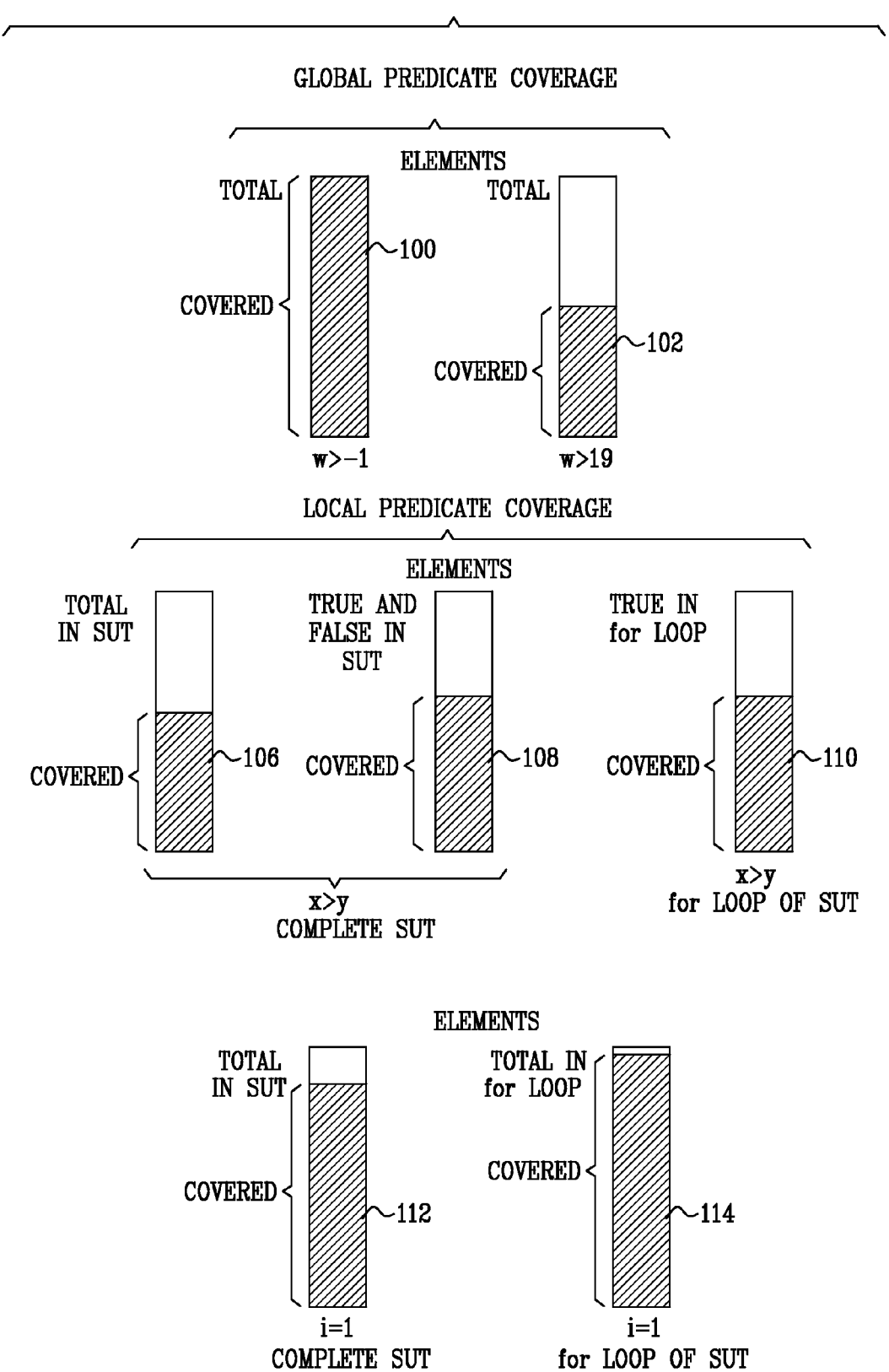
FIG. 3 illustrates examples of graphical outputs of coverage metrics derived from the flowchart of FIG. 2, according to an embodiment of the present invention.

FIG. 3 illustrates examples of graphical outputs of coverage metrics derived from flowchart 40, according to an embodiment of the present invention. The graphs in FIG. 3 may be displayed on screen 35 (FIG. 1). Graphs 100 and 102 respectively correspond to the coverage metrics calculated in Table V for predicate w>−1 and w>19. Graphs 100 and 102 illustrate different coverage metrics derived using global predicates.

Graphs 106, 108, 110, 112, and 114 illustrate coverage metrics derived using local predicates, using the results of Table VII. Graphs 110 and 114 respectively correspond to the for loop coverage metrics calculated in Table VII. Graphs 106 and 112 use the results from Table VII to show the results for the same predicates as graphs 110 and 114, but calculating the coverage over all elements of SUT 22E. Graph 108 has the same number of covered elements as graph 106, but compares the covered elements with the total of true and false returns, rather than the total number of elements as in graph 106.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for determining coverage of testing of a software under test (SUT), comprising:
defining predicates to be used for coverage determination, the predicates include at least a first Boolean predicate and a second Boolean predicate,
wherein the first Boolean predicate is a local predicate that is calculable over a first section of the SUT and non-calculable on any other portion of the SUT,
wherein the second Boolean predicate is a global predicate that is calculable over each element of the SUT;
for substantially each exercised element of the SUT which was exercised during a testing of the SUT, determining, for each predicate of the predicates, whether the predicate is calculable for the exercised element, and in response to a determination that the predicate is calculable, evaluating the predicate, wherein said determining whether the predicate is calculable is performed by determining, for each variable based on which a value of the predicate is defined, whether the variable is defined in the exercised element of the SUT, whereby calculable sections of the predicate are determined based on a scope in which local variables of the predicate are calculable;
determining coverage of the testing of the SUT based on the exercised elements and the predicates, wherein said determining coverage comprises:
determining a first coverage measurement of the testing of the SUT based on a ratio between a number of exercised elements for which the first Boolean predicate is evaluated to a predetermined value and a number of exercised elements of the SUT;
determining a second coverage measurement of the testing of the SUT based on a ratio between a number of exercised elements for which the first Boolean predicate is evaluated to the predetermined value and a number of exercised elements of the SUT for which the first Boolean predicate is calculable; and
determining a third coverage measurement of the testing of the SUT based on a ratio between a number of exercised elements for which the second Boolean predicate is evaluated to the predetermined value and a number of exercised elements of the SUT; and
outputting the determined coverage by visually indicating to a user the first, second and third coverage measurements;
whereby avoiding evaluation of the first Boolean predicate when the first Boolean predicate is non-calculable;
whereby the user is provided with information regarding predicates that have different scopes in which they are calculable;
whereby the user is provided with information filtering out non-calculable sections with respect to the first Boolean predicate and with unfiltered information.

2. The method of claim 1 wherein the second Boolean predicate relates to a state of a computerized environment executing the SUT.

3. The method of claim 1 wherein the second Boolean predicate relates to a utilization of processing power of a computerized environment executing the SUT.

4. The method of claim 1 wherein the second Boolean predicate relates to an operation of a software module other than the SUT during the execution of the SUT.

5. The method of claim 1, wherein said outputting comprises:
displaying a first graph visually presenting the number of exercised elements for which the first Boolean predicate is evaluated to the predetermined value out of the number of exercised elements of the SUT; and
displaying a second graph visually representing the number of exercised elements for which the first Boolean predicate is evaluated to the predetermined value out of the number of exercised elements of the SUT for which the first Boolean predicate is calculable.

6. The method of claim 1, whereby the user is provided with information regarding the second Boolean predicate with respect to exercised elements for which the first Boolean predicate is non-calculable.

7. The method of claim 1, wherein the second Boolean predicate is a predicate relating to a number of threads that are executed by the SUT.

8. The method of claim 1, wherein the second Boolean predicate is a predicate relating to whether a specific thread is being executed by the SUT.

9. The method of claim 1, wherein the second Boolean predicate is a predicate relating to a utilization of a Central Processing Unit that is different than a processor being used to execute the SUT.

10. The method of claim 1, wherein a value of the second Boolean predicate is provided by the user who determines the value manually.

11. The method of claim 1, further comprising:
computing for the first Boolean predicate a first total number of exercised elements for which the first Boolean predicate is evaluated to true;
computing for the first Boolean predicate a second total number of exercised elements for which the first Boolean predicate is evaluated to false; and
computing for the first Boolean predicate a third total number of exercised elements for which the first Boolean predicate is non-calculable; and
wherein said outputting is performed to provide the computed first, second and third numbers.

* * * * *